G. P. PILLING.
Milking-Tubes.

No. 156,174. Patented Oct. 20, 1874.

Witnesses
L. F. Brous.
A. P. Grant.

Inventor:
George P. Pilling
by John A. Dudersheim
Atty.

UNITED STATES PATENT OFFICE.

GEORGE P. PILLING, OF PHILADELPHIA, PENNSYLVANIA.

IMPROVEMENT IN MILKING-TUBES.

Specification forming part of Letters Patent No. 156,174, dated October 20, 1874; application filed September 9, 1874.

*To all whom it may concern:*

Be it known that I, GEORGE P. PILLING, of the city and county of Philadelphia, and the State of Pennsylvania, have invented a new and useful Improvement in Milking-Tubes; and I do hereby declare the following to be a clear and exact description of the nature thereof, sufficient to enable others skilled in the art to which my invention appertains to fully understand, make, and use the same, reference being had to the accompanying drawing making part of this specification, in which—

Figure 1:
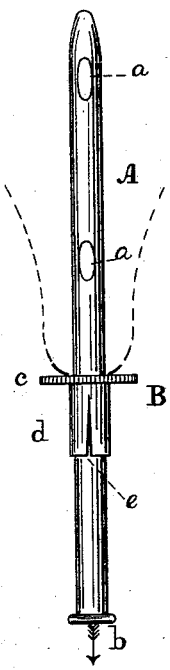
Figure 2:
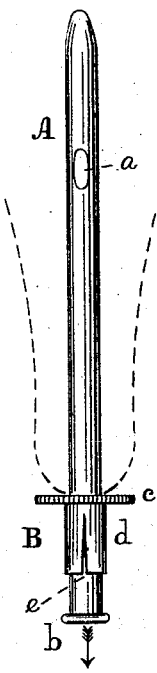
Figure 3:
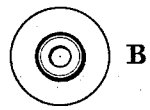
Figure 4:
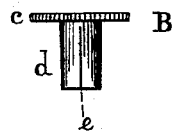

Figures 1 and 2 are side views of the device embodying my invention. Fig. 3 is a bottom view. Fig. 4 is a side view of a detached part.

Similar letters of reference indicate corresponding parts in the several figures.

My invention consists in rendering a milking-tube adjustable to the various sized teats and circumstances of cows and other animals.

Referring to the drawings, A represents a tube which is adapted to be inserted in the teat of a cow, mare, or other animal, and provided with openings $a$ at the upper end, whereby the milk will flow into the tube, the discharge thereof being at the lower end $b$. In order that the tube may be inserted in the teat to the proper depth, there is placed on the tube a collar, B, which has a sliding motion longitudinally thereon. The collar is properly constructed of a disk, $c$, and a split thimble, $d$, the tube passing through the thimble and an opening in the disk. The thimble $d$ is of diameter smaller than that of the tube A and split longitudinally at $e$, so that when the tube is introduced into the said thimble the latter will be expanded and thus hold firmly on the tube.

It will be seen that the collar may be adjusted so that the tube will suit various lengths and certain conditions of teats of animals to be milked.

It is important that the adjustment of the tubes should be delicately accomplished, so that the milk is properly reached and no injury inflicted on the animal. When the collar is once properly placed or adjusted it will retain its position and remain there for successive use on the same animal.

Having thus described my invention, what I claim as new, and desire to secure by Letters Patent, is—

1. The milking-tube A, in combination with a collar adjustably fitted thereon, substantially as and for the purpose set forth.

2. The combination, with a milking-tube, A, of an adjustable collar, B, consisting of a disk, $c$, and expansible thimble $d$, constructed and operating substantially as and for the purpose set forth.

GEO. P. PILLING.

Witnesses:
    JOHN A. WIEDERSHEIM,
    ALBERT H. HOECKLEY.